United States Patent
Fowler

[11] 3,922,107
[45] Nov. 25, 1975

[54] SEWER TAPPING METHOD AND APPARATUS

[76] Inventor: Dwight W. Fowler, 705 SW. 206th Ave., Aloha, Oreg. 97005

[22] Filed: May 31, 1973

[21] Appl. No.: 365,693

[52] U.S. Cl. .............. 408/67; 408/74; 408/92; 408/204
[51] Int. Cl.² .................. B23B 41/00; B23Q 3/18
[58] Field of Search ........... 408/72, 74, 92, 67, 68, 408/204, 206; 137/318, 324

[56] References Cited
UNITED STATES PATENTS

| 266,052 | 10/1882 | Richardson | 408/72 X |
| 2,024,390 | 12/1935 | Roesch | 408/92 X |
| 2,601,434 | 6/1952 | DuBois | 408/67 X |
| 3,293,952 | 12/1966 | Fairbanks | 408/67 X |
| 3,697,188 | 10/1972 | Pope | 408/230 |
| 3,741,670 | 6/1973 | Wood | 408/92 |
| 3,821,965 | 7/1974 | Reynolds | 137/318 |

Primary Examiner—Harrison L. Hinson
Assistant Examiner—W. R. Briggs
Attorney, Agent, or Firm—Klarquist, Sparkman, Campbell, Leigh, Hall & Whinston

[57] ABSTRACT

A sewer main is tapped to receive a branch connection by employing a core drill which is secured to the side of the sewer main for the drilling operation, after which a branch connecting device is secured to the main in substantially the same manner as the core drill was theretofore secured and over the aperture provided by the core drill. The core drill is supplied with a core retaining attachment for preventing loss of the core within the sewer main. A rapidly installed branch connecting device includes a toroidal seal for supporting a branch pipe in a resilient manner.

13 Claims, 6 Drawing Figures

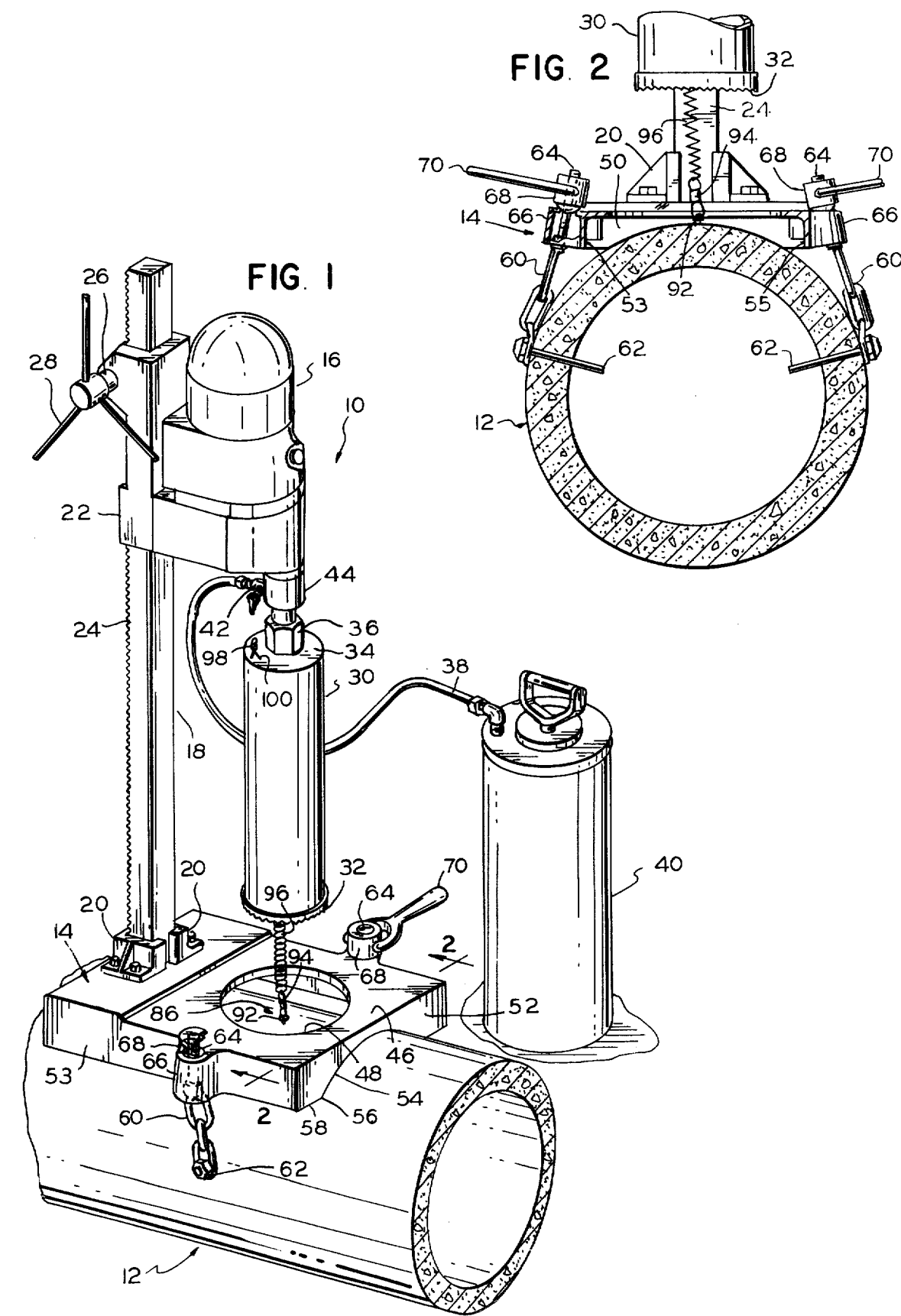

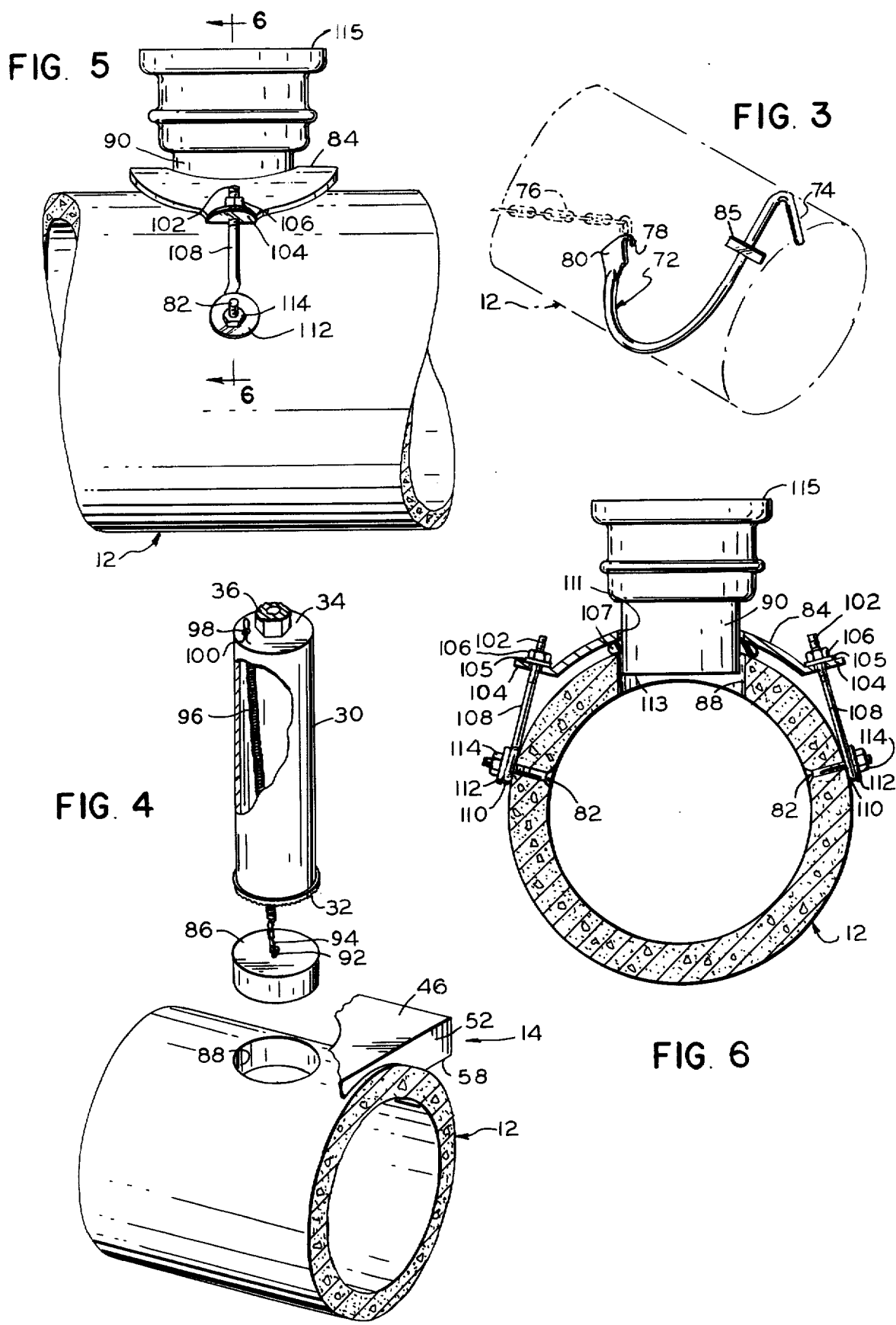

SEWER TAPPING METHOD AND APPARATUS

BACKGROUND OF THE INVENTION

In my U.S. Pat. No. 3,663,042, granted on May 16, 1972, and entitled "Sewer Tap," there is disclosed and claimed a device for sealing and securing a branch pipe to a sewer main in a manner avoiding filtration or breakage due to the weight of backfill subsequently covering the connection. This device includes an apertured clamping plate for receiving the branch pipe and compressing a toroidal seal against the branch pipe and the sewer main. Not only does the toroidal seal provide the desired sealing properties, but it also acts to support the branch pipe resiliently such that breakage and filtration from subsequent causes is avoided. The present invention relates to a method and apparatus for rapidly installing such a sewer tap, and a sewer tape adapted for larger mains.

SUMMARY OF THE INVENTION

In accordance with the method and apparatus of the present invention, a core drill is securely mounted on a sewer main in substantially the same manner subsequently employed to secure a sewer tapping device thereto, the core drill being utilized for removing a core area and providing an aperture over which the sewer tapping device is then installed. According to an aspect of the present invention, the core drill is provided with a base for receiving and stably engaging the wall of the sewer main on opposite sides of the center of the desired aperture in the sewer main. According to another aspect of the present invention, the core drill bit is provided with means for automatically securing or retaining the core to avoid loss of same within the sewer main.

According to still another aspect of the present invention, a "needle" is provided for "threading" a flexible connection around smaller sewer mains for supporting the core drill and also for supporting a sewer tapping device. The needle is forced around the sewer main in a manner avoiding excavation underneath the main. In accordance with yet another aspect of the present invention, a sewer tap for larger sewer mains also avoids excavation underneath the main. By the use of this tap, a clamping plate employed for urging a toroidal seal against a branch pipe and a sewer main is secured in place and drawn up tightly with respect to the sewer main by connecting means joined to a pair of bolts extending through the side wall of the sewer main. The bolts are suitably inserted from the interior of the main through holes initially employed for removably securing the core drill in place.

It is accordingly an object of the present invention to provide an improved method for tapping a sewer main to provide a branch connection thereto.

It is another object of the present invention to provide an improved method and apparatus for cutting an aperture in a sewer main for the installation of a branch connection, without deposition of debris in the sewer main.

It is another object of the present invention to provide an improved method of forming an aperture in a sewer main without depositing a drilled core within the sewer main.

It is a further object of the present invention to provide an improved base for a core drill, adapting the core drill for secure but removable attachment to a sewer main.

It is another object of the present invention to provide an improved method and device for securing a flexible member around a partially excavated sewer main.

It is a further object of the present invention to provide an improved sewer tap adapted for larger sewer mains.

It is another object of the present invention to provide an improved method and device for making a branch connection to a sewer main of comparatively large size without requiring access to the entire girth of the sewer main.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a perspective view illustrating a core drill attached to a sewer main in accordance with the present invention;

FIG. 2 is a cross-sectional view taken at 2—2 in FIG. 1;

FIG. 3 is a perspective view of a "needle" according to the present invention for passing a flexible member around the girth of a sewer main;

FIG. 4 is a perspective view, partially broken away, further illustrating a step in tapping a sewer main in accordance with the present invention employing the FIG. 1 apparatus;

FIG. 5 is a side view of a sewer tap according to the present invention; and

FIG. 6 is a cross-sectional view taken at 6—6 in FIG. 5.

DETAILED DESCRIPTION

Referring to the drawings, and particularly to FIGS. 1 and 2, illustrating the sewer main tapping method of the present invention, a core drill 10 is removably secured to sewer main 12 for the purpose of cutting a circular aperture in the side wall thereof. The core drill is provided with a base 14 for supporting core drill driving motor 16 on an upright standard 18 secured to the left-hand upraised portion of the base by means of a pair of side brackets 20 which are bolted onto the base and which clamp the upright standard 16 therebetween. The driving motor 16 is mounted on a slide 22 adapted for travel in a vertical direction along standard 18, the slide being provided with a pinion (not shown) for engaging rack 24 along the rear edge of standard 18. The aforementioned pinion is secured upon a shaft 26 journaled in slide 22 and rotatable by means of hand level wheel 28 for urging drill bit 30 toward the side wall of sewer main 12.

The drill bit 30 is tubular in shape and is provided with a cutting edge 32 on its lower open end. This cutting edge is suitably formed of a very hard material and may include industrial diamonds secured thereto. The upper end of the tubular drill bit is closed, being provided with an upper disc-shaped wall 34 welded to a threaded connection 36 by means of which the drill bit is secured to the vertical operating spindle of drive motor 16. Water is suitably employed as a coolant and is conveyed by flexible tube 38 from pressure tank 40 to a valve 42 making connection with spindle housing 44.

The base 14 includes a platform 46 at a slightly lower level than the left-hand portion of the base which supports standard 24. The platform 46 includes a central aperture 48 coaxial with and larger in diameter than drill bit 30 for receiving drill bit 30 therethrough when the same is urged downwardly by rotation of hand level wheel 28. The lower or underneath side of the base suitably has a concave contour which may match the curvature of the outside wall of sewer main 12 as the base is placed thereupon. Thus, the base is suitably open underneath having parallel side walls 53 and 55 and having parallel end walls 50 and 52 from which matching arcuate portions have been removed, providing concave, downwardly facing apertures such as indicated at 54 in FIG. 1. While these apertures suitably match the cylindrical contour of a given size of sewer main 12, in general they will have a radius of curvature smaller than that of the sewer main. Thus, the radius of curvature of aperture 54 is suitably made equal to the radius of curvature of the smallest sewer main which likely will be encountered. In the case of larger sewer mains, the base will contact the main at the plurality of points 56, e.g., where the aperture 54 intersects the lower edge 58 of end wall 52, such lower edge being parallel to platform 46. Two such points of contact will usually be located on each side of the diameter of aperture 48 which is parallel to the longitudinal centerline of sewer main 12. However, it is desired that there be at least three such points of contact with at least one point being on each side of the aforementioned diameter of aperture 48, whereby stable support for the base is secured. Instead of each end wall being provided with an aperture such as illustrated at 54, end wall 52 may be provided with such an aperture, while the remaining or opposite end wall is foreshortened to establish substantially a single point of contact on the sewer main 12.

The core drill base is secured to the sewer main, preparatory to drilling, with a pair of flexible connecting means which take the form of chains 60 extending from the base 14 and around the sewer main 12 to the locations of a pair of plugs or pins 62 extending through holes drilled in the side wall of sewer main 12 at either side of the drill bit 30, i.e., at either side of the core area to be removed. The small holes for receiving pins 62 are drilled through the side wall of the sewer main, preferably in the directions aligned with radii of the cylindrical sewer main, after which the pins are inserted through end links of chains 60, the pins having enlarged heads for holding the chains in place.

The upper ends of chains 60 are attached to threaded studs 64 which pass upwardly through apertured ears or lugs 66, these being located on each side of base 14 in line with the center of aperture 48. Above the apertured lugs 66, the studs 64 are threadably engaged by handle nuts 68 which may be provided with rounded undersides partly received into the apertures of lugs 66. Each of the nuts 68 is provided with a pivotably mounted handle 70 in the form of a forked lever, the forked ends of which tiltably engage nuts 68 along axes passing diametrically through the nuts. The handle nuts are utilized for placing the chains 60 under tension for drawing the base 14 up tight against the sewer main 12. While the core drill is illustrated in a substantially vertical position above sewer main 12, it will be appreciated the same can be secured at an angle with respect to the vertical if it is desired to provide an aperture in the side wall of sewer main 12 at an angular location.

For the sake of illustration, the core drill has been illustrated as secured to the sewer main 12 by relatively short chains 60 and pins 62. As will hereinafter become more evident, the sewer tap itself is then secured to the sewer main employing the same small holes drilled in the sewer main for the reception of pins 62, such tap being illustrated in FIGS. 5 and 6. This method and construction has been found quite suitable for connection to larger sewer mains, i.e., having a diameter in excess of 12 inches. In many cases, especially for smaller sewer mains, a flexible member may be passed all the way around the sewer main as in the case of the specific embodiment illustrated in my aforementioned U.S. Pat. No. 3,663,042. In such cases, "needle" 72, illustrated in FIG. 3, becomes useful.

The needle 72 in FIG. 3 is suitably a U-shaped steel rod, describing a semicircular arc between a flat and relatively pointed forward spade tip 80, and a flat plate 85 welded to the needle 72 for properly directing the needle around the sewer main 12. Thus, with the needle extending halfway around the circumference of the sewer main 12 as illustrated in FIG. 3, the plate 85 will be substantially perpendicular to a radius of either the semicircular arc portion of needle 72 or the sewer main itself. Handle 74 is a backwardly bent portion of the steel rod from which the needle 72 is formed and is used as a lever for forcing the needle 72 around sewer main 12 in the first place, and for withdrawing the same with the chain 76 connected thereto.

Needle 72 is useful in passing a flexible member about the sewer main without requiring complete excavation around the sewer main. Thus, primarily only the top surface of the sewer main need be uncovered, i.e., the portion of the sewer main required for support of the core drill, and the needle 72 is forced around the sewer main from the excavated area without requiring excavation underneath the main. Since the needle 72 is essentialy forced around the main and through the surrounding ground, it is provided on its forward end with the spade tip 80 which is flattened in a direction perpendicular to the radius of curvature of the needle arc and the sewer main. The spade tip is somewhat narrowed or nearly pointed at its forward tip except for hook 78 extending from the forward tip, the hook being bent radially toward the sewer main and backwards in the direction of the wall of sewer main 12.

Preparatory to securing the core drill base to the sewer main 12, the needle 72 is grasped by handle 74 and forced around the sewer main 12 in a clockwise direction into the position shown, after which a forward link of the chain 76 is looped onto hook 78 of forward spade portion 80 of needle 72. Then, the needle is withdrawn in the reverse direction, i.e., by rotating the same with the handle in a counterclockwise direction in FIG. 3 to "thread" chain 76 onto the pipe. One end of chain 76 is joined to a stud of the type illustrated at 64 in FIG. 2, and the remaining end of the chain, as threaded around the pipe, is suitably hooked to one short length of chain such as one indicated at 60 at the right-hand side of FIG. 2 similarly having a stud 64 joined to the end thereof. Two handle nuts 68, engaging studs such as illustrated at 64, are then operated for tightly securing a core drill base onto the sewer main 12.

In any case, the sewer tap is subsequently secured to the sewer main substantially similarly to the manner the core drill was thus secured, after the core drill has been employed to drill an aperture in the side of the sewer main. In the case of the sewer tap embodiment as illustrated in FIGS. 5 and 6, stainless steel bolts 82 are extended through the same holes as initially drilled for pins 62, with the bolts 82 forming part of the means for drawing up clamping plate 84 toward sewer main 12. In the case of the specific embodiment illustrated in my aforementioned U.S. Pat. No. 3,663,042, a flexible member extending all the way around the sewer main is utilized for holding sewer tap in place in the same manner as chain 76 was utilized for securing the core drill base to the sewer main. In the latter instance, after the core drilling operation is complete, a flexible member such as a band or cable is connected to one end of chain 76 which has been disengaged from the core drill, and the chain 76 is pulled back around the sewer main after which such flexible member is employed for the purpose of drawing up the sewer tap clamping plate against the side wall of the sewer main.

Returning to FIGS. 1 and 2 and further considering FIG. 4, the core drill 10 is employed for removing a core area 86 from the side wall of sewer main 12 to form an aperture 88 therein, through which a branch pipe or hub 90 may be received (see FIGS. 5 and 6). After securing the core drill 10 to the sewer main 12 as hereinbefore described, a small hole is drilled in the center of the core area 86 to be removed, and a suitable fastener device such as a self-tapping screw 92 is driven into the hole and through a link or eyelet forming part of, or connected to, a first end of a line swivel 94. Such a line swivel is a rotatable or swivelable device commonly employed in fish lines and suitably comprising a short center body rotatably securing eyelets at each end thereof. The second end of the line swivel is connected to an elongated spring 96 ultimately attached to the top wall 34 of drill bit 30 by means of a link extending through a small aperture 98 in the top wall and secured by a cotter pin 100. The spring thus extends longitudinally within core drill 30. A second line swivel is preferably employed for securing spring 96 to cotter pin 100, i.e., such line swivel (not shown) being provided with a first eyelet engaging the upper end of the spring and a second eyelet providing or connected to the link through which cotter pin 100 suitably extends. Although the line swivels are thus preferably disposed at each end of spring 96 as described above, a single line swivel or similar device may be employed at either end of the spring or even between sections of the spring dividing the spring into two parts. Alternatively, a shorter spring may be employed with an intermediate cable making connections between screw 92, pin 100, and intermediate swivel devices. In any case, the spring 96 is of such a length that it continues to bias the core area 86 upward toward the interior of drill bit 30, even as the drill bit 30 engages and cuts through the side wall of sewer main 12.

Sewer main 12 may be formed of concrete, transite, cast iron or the like, and it is desired the core area 86 be drilled out and removed so the same will not fall within the sewer main after drilling through the relatively narrow sewer main wall is complete. Extracting the core in this manner or "catching the block" so the same will not fall into the sewer main, where clogging thereof may occur, is of particular advantage in practical utilization of the method according to the present invention. Thus, when the core drilling is complete, the drill bit can be upraised by means of hand lever wheel 28, and the core is securely held against or within drill bit 30 where it may be conveniently removed without danger of loss of the same within the sewer main and without requiring an attempt at retrieval of same from within the sewer main.

After the core is removed, the core drill may be disengaged from the sewer main by loosening handle nuts 68 and removing pins 62 or removing the chain from around the sewer main as hereinbefore described. The sewer tap is then applied to the sewer main in a substantially similar manner as also herein described. For example, the sewer tap as illustrated in FIGS. 5 and 6 is applied by inserting stainless steel bolts 82 through the holes theretofore provided for pins 62. Bolts 82 are inserted into the said holes from within the sewer main through the aperture 88. For convenience of access from both the exterior and interior of the sewer main, these holes are preferably located in the top half of the sewer main above the horizontal diameter, the holes being aligned with the center of aperture 88 and substantially equally spaced on either side thereof. Connecting means extend around the sewer main 12 from a clamping plate 84 to the bolts 82 for making secure connection with the latter whereby the clamping plate may be tightly drawn up toward the sewer main. In the embodiment of FIGS. 5 and 6 such connecting means comprise stud-like devices having threaded ends 102 which pass through holes provided in ears 104 located on diametrically opposite sides of the clamping plate, i.e., diametrically on opposite sides of aperture 88 and the branch pipe 90 which is smaller in diameter than the sewer main. Washers 105 and nuts 106 are received upon threaded ends 102, and the nuts 106 are turned for tightly drawing up the clamping plate 84 against a toroidal seal 107 formed of a resilient sealing material disposed immediately around and bearing against branch pipe 90, between clamping plate 84 and sewer main 12. The embodiment of FIGS. 5 and 6 is preferred for tapping larger sewer mains because of savings of material and labor compared with extending a flexible member all the way around the larger main. Adequate support is provided from the side of the larger main and it will again be seen that no excavation or access is required underneath the main.

Toroidal seal 107 suitably comprises an O-ring seal formed of synthetic rubber such as neoprene. As the toroidal seal is compressed by drawing up nuts 106, the junction is sealed between the sewer main 12 and branch pipe 90 against outside filtration. At the same time, the toroidal seal securely and substantially entirely supports the end of the branch pipe 90 so that branch pipe 90 can extend, even horizontally, for example, in an otherwise unsupported manner. However, the support thus provided by the toroidal seal is resilient in response to weight placed upon the branch pipe, and therefore the seal is maintained despite pressures that may be applied. For instance, the seal is maintained despite the heavy weight of earth placed upon the sewer tap connection after completion thereof, and such filtration as is common with the usual concrete connection as a result of cracking under the stress of weight is avoided.

Clamping plate 84 is provided with a central aperture 111 slightly larger in diameter than the outside diameter of the branch pipe, through which the branch pipe passes. Also, the diameter of the aperture 88 in the side wall of sewer main 12 is arranged to be slightly larger in diameter than the outside diameter of the branch pipe. The toroidal seal 107 is somewhat larger in cross-sectional diameter than the spacing between branch pipe 90 and either of the apertures 88 and 111. The end 113 of branch pipe 90 may be squared off as shown, but preferably the branch pipe 90 does not protrude farther than the level of the inner wall of the sewer main 12, such that the branch pipe will not impede the passage of materials in the sewer main. Alternatively, the branch pipe end may be contoured to match the inner wall of the sewer main, for example when the diameter of the branch pipe is more than half the diameter of the sewer main. The branch pipe 90 may comprise a hub for receiving a branch pipe extension within enlarged end 115 thereof in a conventional manner.

The clamping plate 84 is suitably formed of cast iron or steel and is disposed in spaced relation to the side of the sewer main, i.e., the major portion of the clamping plate between ears 104 is approximately cylindrical in cross section. Cylindrical is here taken to mean having a configuration in cross section corresponding to a section of a cylinder. Although clamping plate 84 is desirably cylindrical in cross section corresponding to the cross section of sewer main 12, in order to conform generally to the outer cylindrical configuration of main 12, the connection is not restricted to the sewer main of a particular size. Rather, the clamping plate may be utilized for connection to sewer mains having a greater or lesser radius of curvature than the clamping plate. In general it is desirable for the clamping plate to have a cylindrical configuration of cross section comparable to the average size sewer main 12 which it is likely will be encountered. Ears 104 are bent back from this cylindrical configuration to planes for receiving threaded stud ends 102 therethrough in substantially perpendicular relation therewith.

The clamping plate suitably has a substantially constant thickness. This is not taken to mean absolutely constant or of unvarying thickness, but is intended to exclude a plate including a conventional saddle for fitting on the contour of the main, and excluding an outwardly projecting tubular portion for receiving and supporting the branch pipe. Thus, the aperture 111 in clamping plate 84 is intended to pass the branch pipe 90 without engaging the same whereby the branch pipe may flex somewhat under the weight of backfill and weight of the branch pipe itself. Thus, in general, the branch pipe extends through what may be thought of as a flat aperture or hole in the clamping plate, wherein the clamping plate holds down the toroidal seal without being joined to the branch pipe by screw threads or some similar fastening connection which might hinder the flexure of the branch pipe or hamper the seal. Also, as indicated above, clearance is provided between the branch pipe and the apertures and the sewer main and the clamping plate to allow for the sealing and support relation of the toroidal seal as will permit the above mentioned flexure. The intention, again, is to indicate an absence of support connection between the branch pipe and the sewer main, or between the branch pipe and the clamping plate. The actual clearance in many instances may be rather small whereby the toroidal seal may be properly engaged by the clamping plate and sewer main. Of course, with weight of backfill or even in the initial installation of the sewer tap, the branch pipe may be other than exactly coaxial with apertures 88 and 111, or may contact or be tangent with these apertures at some point. However, in general, the larger diameter of the apertures 88 and 111 as compared with the diameter of the branch pipe 90 permits the intended support and flexure.

In the illustrated embodiment, the connecting means extending around the sewer main 12 to the location of bolts 82 comprise stud-like devices and specifically eyebolts having the aforementioned threaded ends 102, and formed into eyes 110 at the opposite ends thereof for receiving the threaded ends of stainless steel bolts 82 therethrough. The bolts 82 are provided with washers 112 between eyes 110 and nuts 114 threadably engaging the bolts 82 which are drawn up for firmly securing the eyes against the sewer main wall. The holes for bolts 82 preferably will have been drilled at such an angle, above the horizontal diameter of the sewer main, so that the threaded end of eyebolts will be pointed toward the holes in ears 104 of clamping plate 84. It is noted the overall length of clamping plate 84 including ears 104 can be slightly less than the outside diameter of the sewer main, whereby the bolts 108 angle inwardly toward one another and toward the ears 104.

The overall advantages of the method and apparatus according to the present invention are numerous. The installation of the entire sewer tap from mounting of the core drill to the completion of the sewer tap can be accomplished in approximately 10–15 minutes rather than requiring, conservatively, a half hour or more as in the case of more conventional methods. No debris or removed side wall material is left within the sewer main. Furthermore, the finished sewer tap is able to maintain a good connection with the sewer main, preventing unnecessary filtration despite the heavy backfill with which the sewer tap is later covered. The overall method and apparatus is of considerable assistance in construction and replacement of sewer taps and has found acceptance in actual practice.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A core drill having a drill bit, means for rotating said drill bit, a supporting base, and a standard for supporting said means for rotating said drill bit from said base, said base being positionable for receiving and engaging the side of a sewer main for directing the drill bit toward a core area in the side wall of said sewer main to be removed to provide an aperture for attachment of a branch connection to said sewer main, a connecting member for removably securing said core area to said drill bit for preventing loss of a drilled core within said sewer main, and swivel means connected to said connecting member, said connecting member and said swivel means being operatively connected between said core area and said drill bit.

2. The apparatus according to claim 1 wherein the connecting member extends longitudinally through the interior of said drill bit and is secured to the top wall of said drill bit.

3. The apparatus according to claim 1 including means for removably securing said base to said sewer main.

4. A core drill base comprising:
means for securing a standard to said base for supporting a core drill,
said base having an underside having means for receiving and engaging the side of a substantially cylindrical sewer main at at least spaced locations around the circumference thereof on opposite sides of the center of the core area to be removed by said core drill to provide an aperture in said sewer main,
and means for removably securing the base to the side of the sewer main including a pair of pin means for insertion through holes drilled in the sides of said sewer main and members for connecting said pin means to sides of said base.

5. The base according to claim 4 wherein the underside of said base is provided with at least three engaging points for engaging the side wall of said sewer main, two of which engage the side wall of said sewer main on opposite sides of a diameter of said aperture which is parallel to the longitudinal axis of said sewer main.

6. The base according to claim 5 wherein said base is provided with at least one small aperture at the side of said base, said means for removably securing the base to the side of the sewer main including a threaded member extending through said small aperture for securing to the sewer main underneath said base, and a mating threaded member for engaging the first mentioned threaded member above said small aperture, said mating threaded member being rotatable for providing tension between said base and said sewer main to removably secure said base to said sewer main.

7. The base according to claim 6 wherein said mating threaded member is provided with internal threads and a handle engaging the exterior of said mating threaded member for operating disposition in substantially perpendicular relation to the centerline of said mating threaded member for rotating said mating threaded member.

8. The base according to claim 4 further provided with an aperture larger in diameter than said drill bit and located in the direction of movement of said drill bit through which said drill bit is adapted to pass with clearance toward the side of the sewer main.

9. A core drill base comprising:
means for securing a standard to said base for supporting a core drill,
said base having an underside having means for receiving and stably engaging the side of a substantially cylindrical sewer main in the vicinity of a core area to be removed by said core drill to provide an aperture in said sewer main,
and means for removably securing the base to the side of the sewer main including a pair of pin means for insertion through holes drilled in the sides of said sewer main and members for connecting said pin means to sides of said base.

10. A device for severing and removably securing a core area from its surroundings comprising a core drill bit having an interior portion for receiving said core area, a fastener secured to said core area, swivel means connected to said fastener and an elongated connecting member attached by one of its ends to said swivel means and by another end to the interior of said drill bit with the drill bit positioned over said core area for turning said connecting member with relative rotation between the drill bit and the core area.

11. The device according to claim 10 wherein said connecting member includes extensible biasing means yieldably urging said core area toward said drill bit.

12. The device according to claim 11 wherein said biasing means comprises a longitudinally extending spring connected between said swivel means and an upper interior portion of the drill bit, said swivel means comprising at least one line swivel connected to an end of said spring.

13. The device according to claim 12 also including a line swivel connected to the remaining end of said spring.

* * * * *